Figure 5:
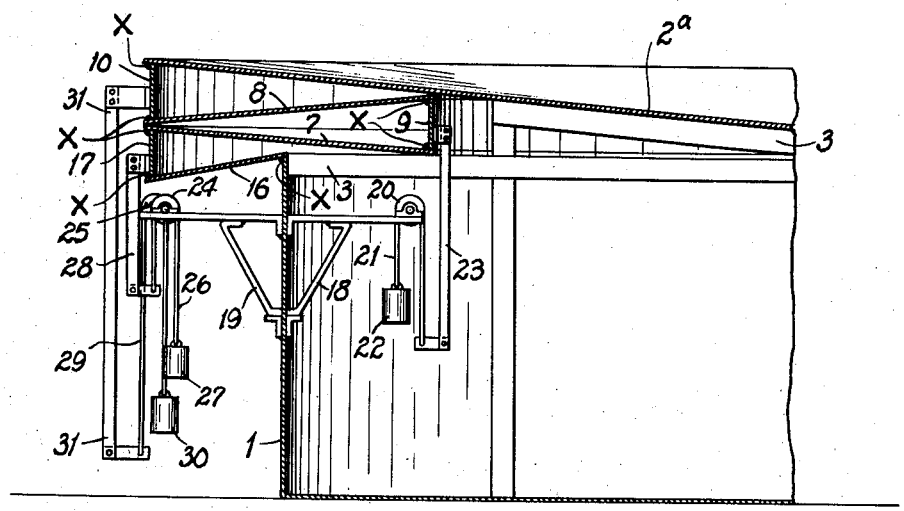

March 7, 1939. J. H. WIGGINS 2,149,376
GAS AND/OR LIQUID STORAGE APPARATUS
Filed Oct. 21, 1937 2 Sheets-Sheet 1
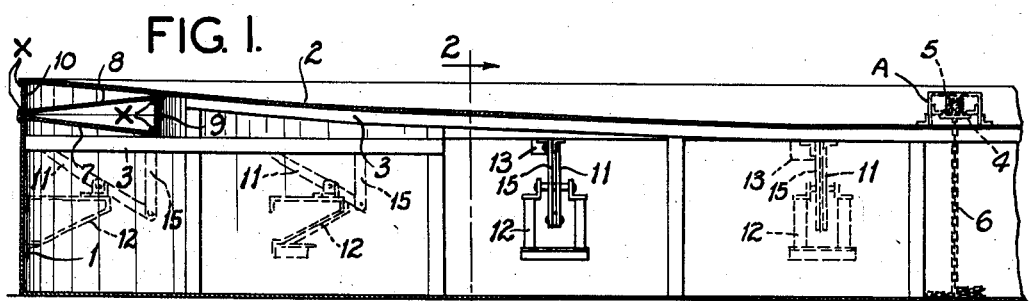
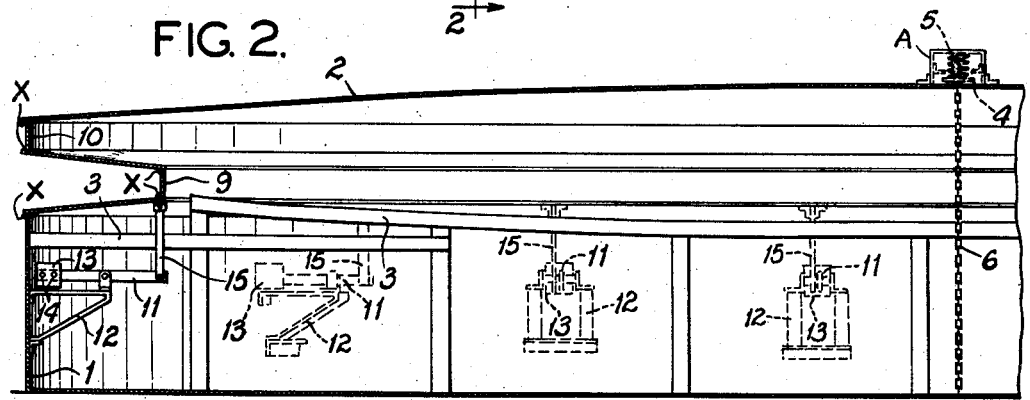
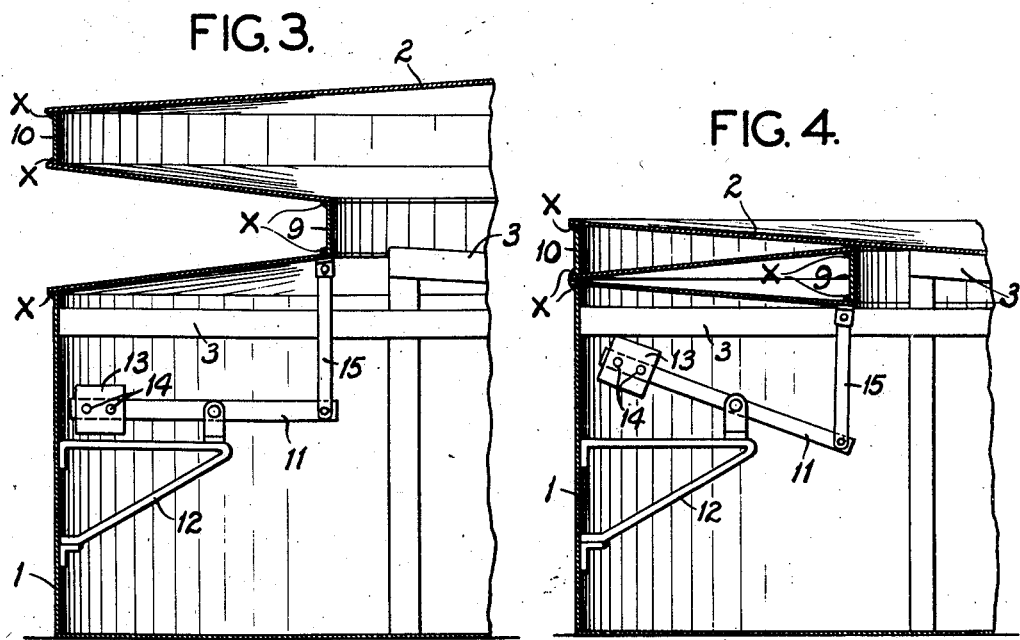
INVENTOR:
JOHN H WIGGINS
BY *Nells L. Church*

March 7, 1939.  J. H. WIGGINS  2,149,376
GAS AND/OR LIQUID STORAGE APPARATUS
Filed Oct. 21, 1937   2 Sheets—Sheet 2

INVENTOR;
JOHN H. WIGGINS
BY Wells R. Church
ATTORNEY

Patented Mar. 7, 1939

2,149,376

UNITED STATES PATENT OFFICE 2,149,376

GAS AND/OR LIQUID STORAGE APPARATUS

John H. Wiggins, Chicago, Ill.

Application October 21, 1937, Serial No. 170,201

16 Claims. (Cl. 220—1)

This invention relates to apparatus for storing gases and/or volatile liquids and particularly apparatus of the type in which the vapor space or gas storage space comprises a metal roof that is capable of moving bodily in a vertical direction (upwardly and downwardly) to vary the volume of said storage space.

The main object of my invention is to provide an all-metal apparatus of great storage capacity that is inexpensive to build, reliable in operation, and easy to inspect and keep in a gas-tight condition. Other objects and desirable features of my invention will be hereinafter pointed out.

To this end I have devised a storage apparatus for gases and/or volatile liquids, which briefly described, consists of a stationary lower portion preferably constructed in the form of a metal tank provided with a vertical side wall, a metal roof for said tank, and an all-metal bellows structure of novel design for joining said roof to the stationary lower portion of the apparatus and for permitting said roof to move bodily upwardly and downwardly relatively to the stationary side wall of the tank, to vary the volume of the gas storage space. The roof is preferably of the so-called "breather type", although a rigid or substantially inflexible metal roof may be used and said roof may either be of approximately the same diameter as the tank or of considerably greater diameter, so that the peripheral portion of the roof will project laterally beyond the side wall of the tank. The bellows structure that is used to join the roof to the tank and provide for the bodily movement of the tank in a vertical direction is so designed that, notwithstanding the fact that it is composed of only a relatively few rugged parts that are joined together by easily inspectable and accessible joints, the structure is capable of relatively great elongation and contraction. This is an exceptionally desirable characteristic of an all-metal storage apparatus for gases and/or volatile liquids because it reduces the number of gas-tight joints in that portion of the apparatus which provides for the vertical movement of the roof, it reduces the number of parts required to form the said portion and it permits the parts of said portion to be made large enough and rugged enough to successfully withstand the strains to which they are subjected in the normal operation of the apparatus.

While the specific details of construction of the bellows structure above referred to may be varied somewhat without departing from the spirit of my invention, the said structure is distinguished from metal Sylphons, bellows and analogous expansible and contractible structures of conventional design in that the washer-shaped or ring-shaped elements of same are so constructed and arranged that they are capable of moving or flexing upwardly from a normal downwardly inclined position, through a horizontal plane and then into an upwardly inclined position, with the result that the degree of expansion or elongation of the bellows structure is practically doubled. Preferably, the said bellows structure is composed of a plurality of substantially flat rings or washer-shaped elements arranged in superimposed relationship and combined with an interposed spacing means in such a way that when the structure is in its collapsed or contracted condition, adjacent washer-shaped elements will be inclined at opposite angles to each other and in such directions that when the structure starts to elongate or expand, one of the washer-shaped elements will swing upwardly through a horizontal plane into an angular position just the opposite to its former position, and as the elongation or expansion continues, a succeeding washer-shaped element will move or flex upwardly through a horizontal plane into a position just the opposite to its previous position. Hence the total expansion or degree of elongation of the bellows structure as an entirety is represented by the sum of the distances which the respective washer-shaped elements move or flex in a vertical direction. For example, if the bellows structure comprises two oppositely inclined washer-shaped elements each of which has a downward pitch or inclination of, say, 6 inches when the structure is in its collapsed or contracted condition, the entire upward movement or flexing of each washer-shaped element will be one foot and the maximum expansion of the entire structure will be two feet.

It is immaterial, so far as my broad idea is concerned, how many washer-shaped elements and co-acting spacing members are used to form the bellows structure, so long as said structure comprises (1) at least two washer-shaped elements arranged in superimposed relationship and disposed so that they slope oppositely to each other when the bellows structure is collapsed or contracted; and (2) a vertically-disposed sleeve or tubular-shaped spacing member interposed between and joined by gas-tight joints to corresponding edges of said elements and made of sufficient height or depth to provide for the opposite inclination or slope of said washer-shaped elements when the structure is contracted. If the structure comprises three or more superimposed washer-shaped elements, a plurality of tubular-shaped spacing members are employed, and said washer-shaped elements and spacing members are so arranged that when the structure is contracted, the adjacent washer-shaped elements slope oppositely to each other but the alternate elements slope in the same direction to each other but oppositely to the intermediate element or elements between which they are interposed. If the apparatus is provided with a breather type roof, the bellows structure will be provided at its extreme upper end with a vertically disposed sleeve or tubular-shaped member to which the peripheral edge of the roof is attached by a gas-tight joint, the said top sleeve being of greater diameter than the next lower sleeve or spacing device of the bellows structure and arranged in concentric relationship with the same so as to permit said sleeves to move into telescoped or approximately telescoped relationship when the bellows structure contracts or collapses.

Figure 1 of the drawings is a fragmentary vertical transverse sectional view of an apparatus embodying my invention equipped with a breather type roof, showing said roof in its extreme downwardly flexed condition.

Figure 2 is a fragmentary vertical transverse sectional view of said apparatus taken on the line 2—2 of Figure 1, showing the roof in its extreme upwardly flexed condition.

Figure 6:
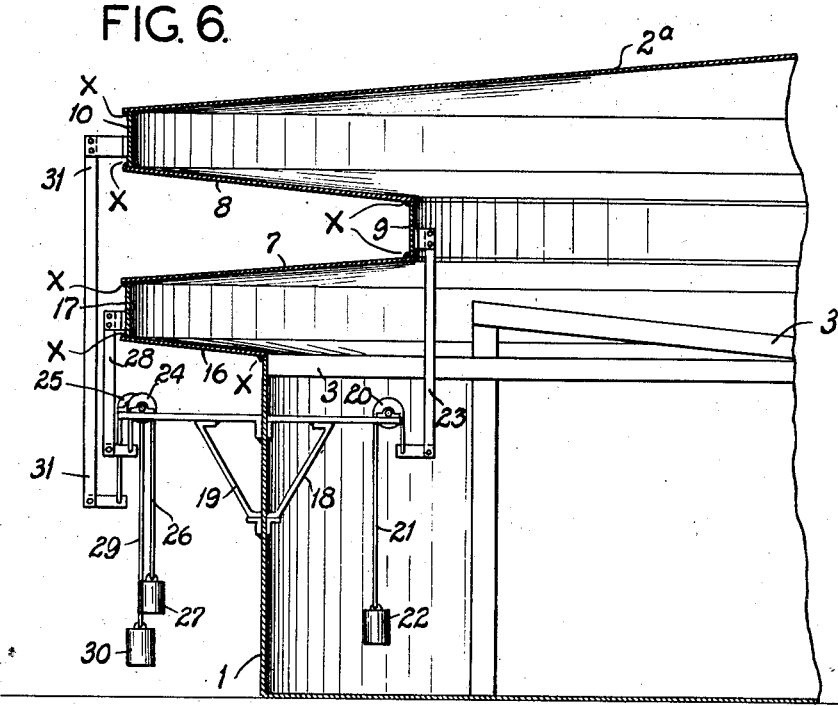

Figures 3 and 4 are fragmentary views on an enlarged scale, illustrating the action of the counter-weighting mechanism used to assist the bodily upward movement of the roof; and Figures 5 and 6 are fragmentary vertical transverse sectional views, illustrating my invention embodied in an apparatus provided with a roof whose peripheral portion projects laterally beyond the side wall of the tank, and equipped with a bellows structure and counter-weighting mechanism of slightly different construction from those shown in Figures 1 to 4.

As shown in the accompanying drawings, the stationary lower portion of the apparatus is formed by a metal tank provided with a vertically disposed side wall 1. Said tank is equipped with a metal roof 2 that may either be of the so-called "breather type" or of the rigid type. I prefer to use a breather type metal roof 2 formed preferably from a limber metal diaphragm which is of such construction that it is capable of assuming a downwardly flexed condition when the tank is empty or under a certain approximate pressure, and capable of assuming an upwardly flexed condition as shown in Figure 2 when the tank is full or when the gas storage space of same is under a relatively high pressure, the upward flexing of the roof 2 from one to the other of the positions mentioned or to an intermediate position resulting in a variation in the volume of the gas space of the tank. As is usual in gas and liquid storage apparatus of the type to which my invention relates, a stationary supporting structure, designated as an entirety by the reference character 3, is arranged inside of the tank so as to sustain the roof 2 and the bellows structure hereinafter described, when said roof is in its extreme downwardly flexed condition, and an automatic pressure relief valve A of any suitable type or kind is employed to vent the gas space after the roof rises or moves upwardly to a certain approximate point or position. The pressure relief valve A herein illustrated is mounted on the roof 2 of the tank and is equipped with a movable valve element 4 that is normally held seated by a spring 5, and an actuating device consisting of a chain cable or equivalent element 6 is attached to said valve element and to the bottom of the tank so as to open said valve element and thus vent the gas space of the tank after the roof 2 has moved or flexed upwardly to a certain approximate position.

The roof 2 is joined to the side wall 1 of the tank by a metal bellows structure that is novel in that the parts of same are so constructed and arranged that the number of gas-tight joints of the structure are reduced to a minimum, the number of parts required to form a bellows of a certain capacity or degree of elongation is reduced, and the gas-tight joints of the structure are so located that they can easily be inspected and caulked or otherwise treated to render them gas-tight. In the form of my invention shown in Figures 1 to 4 the roof 2 is of approximately the same diameter as the tank and the bellows structure above referred to is arranged within the marginal limits of the side wall 1 of the tank. Said bellows structure comprises two flat rings or substantially annular-shaped elements 7 and 8 arranged in superimposed relationship and combined with two vertically disposed sleeves or tubular-shaped spacing devices 9 and 10 disposed in such relationship with each other that when the structure is collapsed or in a contracted condition, the annular-shaped element 7 will slope inwardly and downwardly from the upper edge of the side wall 1 of the tank and the annular-shaped element 8 will slope downwardly and outwardly from the upper edge of the spacing member 9. The annular-shaped elements 7 and 8 and the tubular-shaped spacing members 9 and 10 are formed from metal plates and are joined together by gas-tight joints $x$ produced by welding or any other suitable procedure. As shown in the drawings, the peripheral edge of the roof 2 is connected by a gas-tight joint to the upper end of the top spacing member 10 and when the bellows structure is collapsed or contracted said top spacing member 10 is in telescoped or substantially telescoped relationship with the bottom spacing member 9.

When the tank is empty or when the internal pressure of the gas space is not sufficient to overcome the force of gravity tending to deflect the roof 2, the roof assumes a downwardly deflected position and rests upon the stationary supporting structure 3 inside of the tank. At such times the bellows structure is also sustained by said supporting structure and the annular-shaped elements 7 and 8 of the bellows structure slope in opposite directions. During the operation of admitting the medium to be confined in the tank the internal pressure in the gas space increases or builds up and when the internal pressure equals the weight of the roof, said roof will start to flex upwardly into a position substantially the reverse from its former position. If the internal pressure increases the upper spacing sleeve 10 of the bellows structure will rise and thus cause the top annular-shaped element 8 to flex upwardly through a horizontal plane and assume a position just the opposite to its former position after which the bottom spacing member 9 of the bellows structure rises and causes the bottom annular-shaped element 7 to flex upwardly into a position where it is inclined upwardly as shown in Figure 2 of the drawings. At a certain point in the bodily upward movement of the roof, the volume control valve A operates automatically to vent the gas space and relieve the internal pressure of the tank. Withdrawal of the medium confined in the tank or a diminution of the internal pressure of the gas space causes the bellows structure to collapse or contract, thus permitting the roof 2 to move bodily downwardly and if the internal pressure of the gas space becomes less than the weight of the roof, the roof will flex downwardly into the position shown in Figure 1.

An apparatus of the construction above described is inexpensive to build, it is reliable in operation, and it is easy to keep in a gas-tight condition, due primarily to the fact that the bellows structure which joins the roof to the side wall of the tank and provides for the bodily vertical movement of the roof comprises only a relatively few parts of substantial size and rugged design that are joined together and to the roof and side wall of the tank by joints on the exterior of the structure that are easy to inspect, caulk or keep in a gas-tight condition. In my improved bellows structure herein illustrated, the annular-shaped elements 7 and 8 of same are capable of moving or flexing in a vertical direction practically twice as far as the corresponding elements of a conventional metal Sylphon or bellows due to the fact that when the structure is in a collapsed or contracted condition each of the annular-shaped elements of same slopes downwardly below a horizontal plane and is capable of moving upwardly through said horizontal plane and assuming an upwardly inclined position when the structure distends, elongates or expands. This double flexure or reversal in slope, from a downward inclination to an upward inclination, of the annular-shaped elements 7 and 8 of the bellows structure is, of course, attained by interposing a spacing sleeve or tubular member 9 of substantial heighth between the inner edges of the annular-shaped elements 7 and 8 instead of connecting the corresponding edges of the annular-shaped elements of the bellows structure directly to each other as has heretofore been the usual practice in metal Sylphons, bellows and analogous expansible and contractible devices.

In building the apparatus I prefer to dispose the annular-shaped elements 7 and 8 in a downwardly sloped condition at the time they are joined to the parts with which they coact and, as previously stated, I prefer to equip the apparatus with a breather type roof that is sloped downwardly and inwardly in the operation of erecting the same, and attach the peripheral edge of said roof to the upper end of the bellows structure by a sleeve or tubular-shaped spacing member 10 that provides for the downward slope of the roof when the tank is empty. However, as previously stated, the tank can be equipped with a metal roof of the rigid type in which event the tubular spacing member at the upper end of the bellows structure is not absolutely necessary.

In order to eliminate injurious strains in the bellows structure that might be created if the internal pressure in the gas space were relied upon solely to effect the upward flexing or movement of the coacting parts of the bellows structure, counter-weights or an equivalent means is employed to assist the bodily upward movement of the roof and the means employed to joint the peripheral edge of the roof to the side wall of the tank. In Figures 1 to 4 of the drawings I have illustrated the apparatus as being equipped with a novel counter-weighting mechanism that comprises a plurality of sets of counter-weights, levers and links arranged circumferentially around the side wall of the tank on the interior of the tank and joined to the tubular bottom spacing member 9 of the bellows structure. For sake of clarity, only one of said sets is shown in full lines in Figures 1 to 4 but it will be understood that the complete apparatus comprises a plurality of such sets arranged in spaced relationship around the interior of the tank as indicated in broken lines. Each of said sets comprises a lever 11 pivotally on a bracket 12 projecting inwardly from the side wall of the tank, and having mounted on one end of same an adjustable counter-weight 13 that is retained in adjusted position on the lever by set screws or other suitable retaining devices 14. The opposite end of the lever 11 is joined by a rigid link 15 to the bottom spacing member 9 of the bellows structure with the result that when the roof rises and falls during the normal use of the apparatus, the counter-weights 13, levers 11 and links 15 will function to assist in the movement and control of the roof and the bellows structure that coacts with the same.

In Figures 5 and 6 I have illustrated my invention embodied in an apparatus equipped with a breather type roof 2a of greater diameter than the tank whose peripheral portion projects laterally beyond the side wall of the tank. Said roof is joined to the side wall of the tank by a bellows structure of the same general design as the one previously described but modified by the addition to same of a third washer-shaped element 16 and a third spacing sleeve 17 arranged at the lower end of the bellows structure and disposed so that the element 16 projects downwardly and outwardly from the side wall of the tank when the bellows structure is in a collapsed or contracted condition, the spacing sleeve 17 being so disposed that the annular-shaped element 7 slopes inwardly and downwardly from said spacing sleeve 17 when the tank is empty. In the normal use of the apparatus, the bellows structure elongates and contracts as indicated in Figure 6, thereby causing the annular-shaped elements 16, 7 and 8 of same to reverse from a downwardly inclined to an upwardly inclined position and vice versa, when the roof 2a of the apparatus rises and falls. The counter-weighting mechanism that I prefer to use when the apparatus is equipped with an extended roof is of different form from the one shown in Figures 1 and 4 and comprises a plurality of sets of counter-weights, cables and links, disposed circumferentially around the side wall of the tank and arranged on the interior and exterior of said side wall. Each of said sets comprises two brackets 18 and 19 attached to the side wall of the tank on the inner side and outer side of same and preferably arranged diametrically opposite each other so as to tend to counteract any tendency of the side wall to bend, due to the strains imposed on same by the counter-weighting mechanism. The inner bracket 18 of each set carries a sheave or pulley 20 over which travels a cable 21, having attached to one end of same a counter-weight 22, the opposite end of said cable being joined by a rigid link 23 to the inner spacing sleeve 9, namely, the sleeve located nearest to the center of the tank. The outwardly projecting bracket 19 of each set carries two additional sheaves or pulleys 24 and 25 that are illustrated as being arranged one in advance of the other but which in practice are preferably arranged side by side on the bracket 19. The pulley 24 sustains a cable 26 to one end of which a counter-weight 27 is attached and the opposite end of said cable 26 is joined by a rigid link 28 to the spacing sleeve 17 of the bellows structure. Similarly, the pulley 25 sustains a cable 29 provided with a counter-weight 30 and attached by means of a rigid link 31 to the top spacing sleeve 18 of the bellows structure to which the roof of the apparatus is attached.

Having thus described my invention, what I claim as new and desire to secure by Letters Patent is:

1. A gas and/or liquid storage apparatus, consisting of a stationary lower portion, a metal roof for said lower portion and a metal bellows structure that joins said roof to said lower portion and permits said roof to rise bodily relatively to said lower portion due to an increase in the internal pressure of the gas space of the apparatus, said bellows structure comprising a plurality of superimposed substantially flat rings or washer-shaped elements combined in such a way that adjacent elements slope oppositely to each other when the bellows structure is contracted.

2. An apparatus of the kind described in claim 1, in which the roof is of the breather type.

3. An apparatus of the kind described in claim 1, equipped with a means separate and distinct from the internal pressure of the gas space for assisting in the upward movement of the roof.

4. An apparatus of the kind described in claim 1, in which the bellows structure comprises a vertically disposed tubular spacing member interposed between and attached to corresponding edges of two of the washer-shaped elements, said spacing member and elements being so arranged as to provide for the opposite slope or angle of said elements when the bellows structure is in a collapsed or contracted condition.

5. A gas and/or liquid storage apparatus, comprising a tank provided with an upright side wall, a metal roof for said tank, a metal bellows structure for joining the peripheral edge of said roof to the upper end of said side wall, and a supporting structure inside of the tank for sustaining the weight of the roof when said bellows structure is collapsed or contracted, said bellows structure being composed of a plurality of superimposed washer-shaped elements combined with a spacing means which maintains adjacent elements in oppositely sloped positions when the structure is collapsed.

6. An apparatus of the kind described in claim 5, in which the roof is of the breather type and provided with a peripheral portion which projects laterally beyond the side wall of the tank.

7. An apparatus of the kind described in claim 5, equipped with a roof counter-weighting mechanism that comprises parts arranged on the interior of the tank.

8. An apparatus of the kind described in claim 5, equipped with a roof counter-weighting mechanism that comprises parts arranged on the interior and exterior of the tank.

9. A gas and/or liquid storage apparatus, comprising a tank having an upright side wall, a metal roof of the breather type for said tank and an all-metal bellows structure attached by gas-tight joints to the peripheral edge of said roof and to the upper end portion of said side wall, said structure comprising a plurality of superimposed washer-shaped elements and a plurality of concentrically arranged spacing sleeves, combined so that when the bellows structure is in a collapsed condition adjacent washer-shaped elements are disposed in an oppositely sloping position, and said spacing sleeves are in telescoped or substantially telescoped relationship.

10. An apparatus of the kind described in claim 9, equipped with a roof counter-weighting mechanism that comprises parts arranged on the interior of the tank and attached to one of said spacing sleeves at a point some distance inwardly from the side wall of the tank.

11. A gas and/or liquid storage apparatus, consisting of a tank having an upright side wall, a metal roof for said tank, a telescopic bellows structure all of whose parts are formed of metal, attached to the peripheral edge of said roof and to the upper end of said side wall, a supporting structure on the interior of the tank for sustaining the weight of said roof under certain conditions and a counter-weighting mechanism for assisting in the upward movement of said roof, comprising rigid links arranged on the interior of the tank at a point some distance inwardly from the side wall of same and attached to a part of said bellows structure.

12. A gas and/or liquid storage apparatus, consisting of a tank provided with an upright side wall, a breather type metal roof for said tank and an all-metal bellows structure for connecting said roof to said side wall, said structure comprising a plurality of superimposed washer-shaped elements, the bottom one of which has its outer edge attached to the side wall, a spacing sleeve interposed between and attached to the inner edges of said elements and a separate spacing sleeve attached to the outer edge of the upper washer-shaped element and also to the peripheral edge of the roof.

13. An apparatus of the kind described in claim 9, equipped with a roof counter-weighting mechanism that comprises devices on the inside of the roof arranged so as to exert an upward thrust on the bottom spacing sleeve of the bellows structure.

14. A gas and/or liquid storage apparatus, comprising a tank having an upright side wall, a breather type metal roof whose peripheral portion projects laterally beyond the side wall of the tank, and an all-metal bellows structure for joining said roof to said side wall comprising at least three superimposed washer-shaped elements and at least three vertically disposed spacing sleeves, combined in such a way that when the internal pressure of the gas space is not sufficient to sustain the weight of the roof the top and bottom washer-shaped elements slope downwardly and outwardly away from the center of the tank, and the intermediate washer-shaped element and the roof slope downwardly and inwardly toward the center of the tank.

15. An apparatus of the kind described in claim 14, equipped with a roof counter-weighting mechanism that comprises members attached to the spacing sleeves of the bellows structure for exerting upward thrusts on the same.

16. A storage tank comprising a tank body, a roof supporting structure, a rolled steel plate roof normally supported by said roof supporting structure, and a metallic bellows connecting leak tight the said tank body to the said roof, said metallic bellows comprising a plurality of rolled steel plate rings connected circumferentially alternately at their inner and outer peripheries to vertical rims that normally hold one periphery of said rings spaced apart.

JOHN H. WIGGINS.

CERTIFICATE OF CORRECTION.

Patent No. 2,149,376. March 7, 1939.

JOHN H. WIGGINS.

It is hereby certified that error appears in the printed specification of the above numbered patent requiring correction as follows: Page 3, second column, line 10, after the word "pivotally" insert mounted; page 4, second column, line 38, claim 13, for the claim reference numeral "9" read 12; and that the said Letters Patent should be read with this correction therein that the same may conform to the record of the case in the Patent Office.

Signed and sealed this 2nd day of May, A. D. 1939.

(Seal)

Henry Van Arsdale
Acting Commissioner of Patents.